Jan. 6, 1970

E. I. FOX 3,487,705

FRICTION DRIVE MECHANISM

Filed Jan. 15, 1968

Inventor:
Edward I. Fox
By McCanna, Morsbach & Pillote
Att'ys

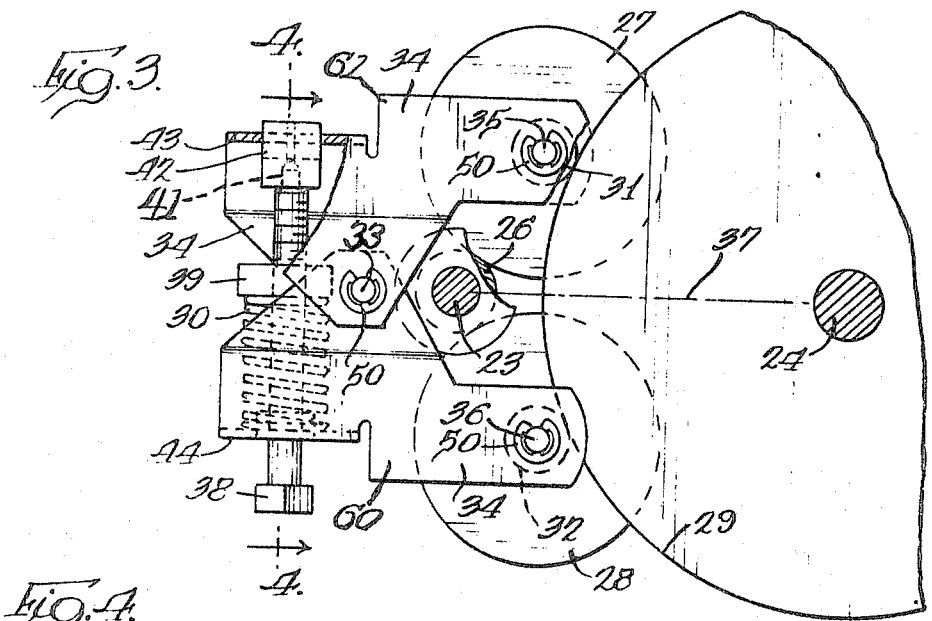
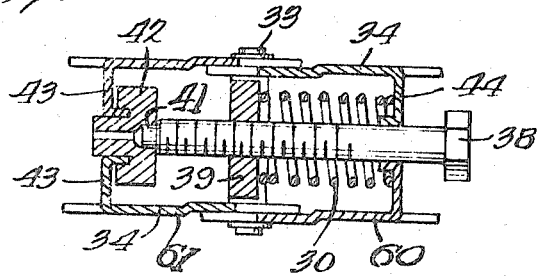
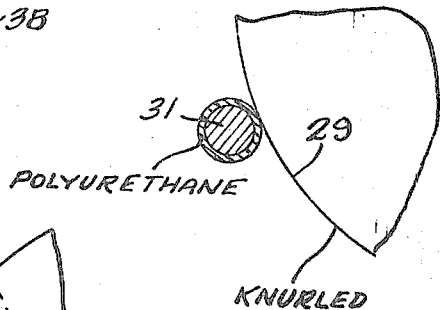
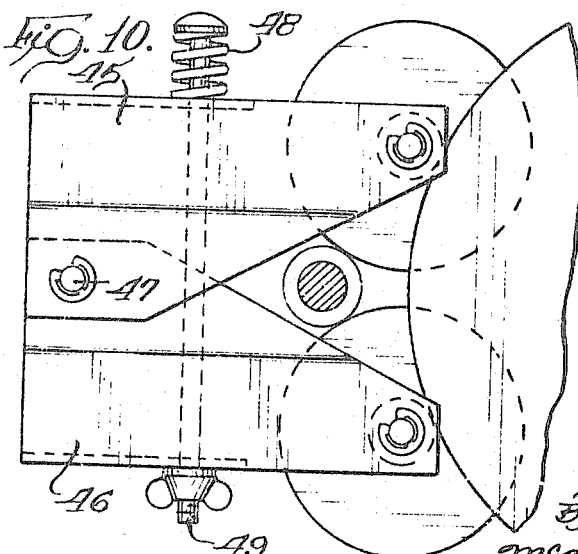

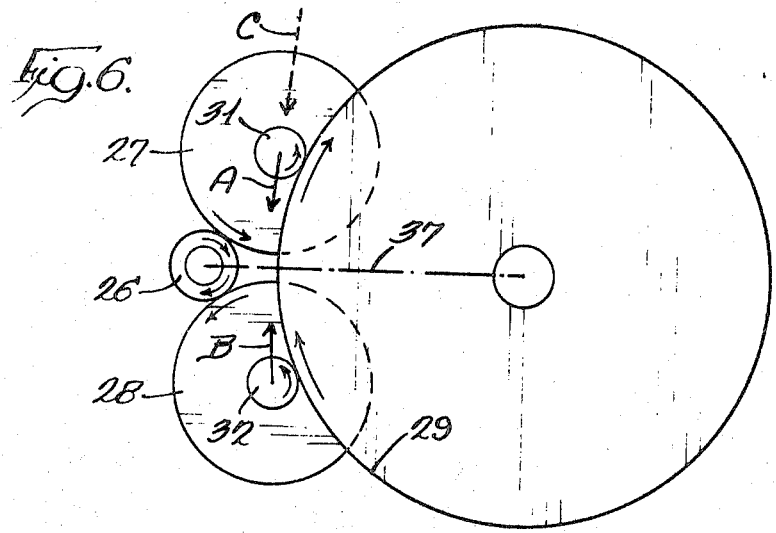
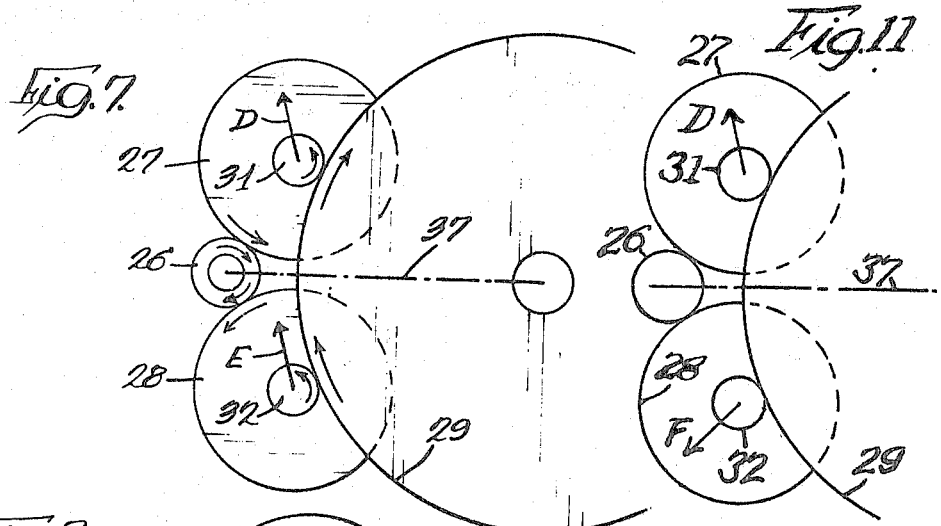
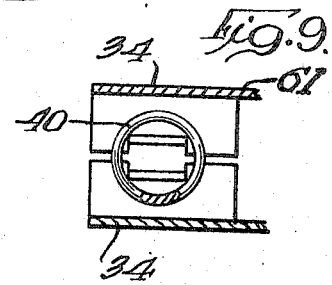
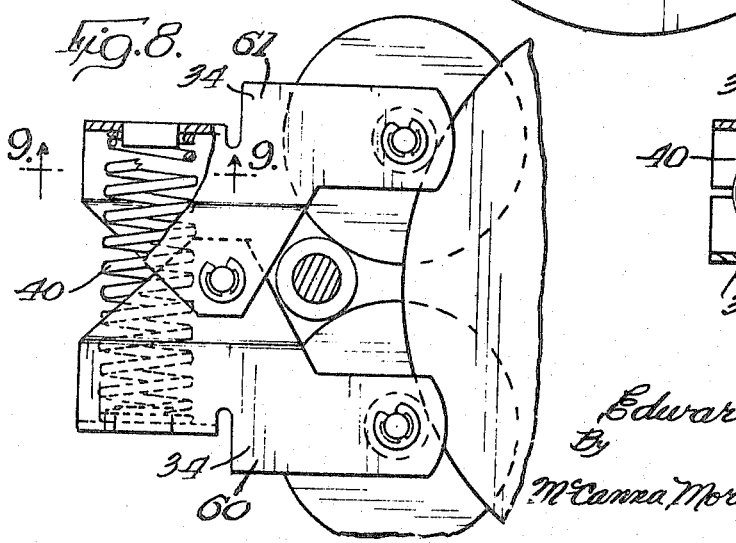

United States Patent Office 3,487,705
Patented Jan. 6, 1970

3,487,705
FRICTION DRIVE MECHANISM
Edward I. Fox, Chicago, Ill., assignor to H. W. Crane Company, Maywood, Ill., a corporation of Illinois
Filed Jan. 15, 1968, Ser. No. 697,820
Int. Cl. F16h 13/08
U.S. Cl. 74—209          6 Claims

ABSTRACT OF THE DISCLOSURE

This invention relates to friction drive mechanism for converting rotary motion from a driving means such as an electric motor to a driven means such as for transmitting lineal movement to the ultimate work or thing to be operated. Said mechanism is characterized by an assemblage of two sets of intermediate friction wheels, each set having in coaxial relation a wheel in frictional driving contact with the driving means and a second wheel in frictional driving contact with the driven means, together with means for yieldingly urging said sets of friction wheels into said frictional contacts in a manner to transmit positive drive with a self-compensating effect against objectionable slippage in transmitting the ultimate drive.

---

Specifically, the invention is applied for operating garage doors and the like in opening and closing movements. The invention provides a novel friction drive mechanism which serves to overcome or minimize the so-called impact or shock loading in drive operations. It also provides positive drive under variable work loads. The mechanism is characterized by a driving wheel and a driven wheel in parallel laterally spaced relation and two sets of intermediate friction wheels in an assemblage operating between the driving and driven wheels, each set of intermediate wheels being in frictional driving engagement with the driving and driven wheels and under continuous yielding pressure in such engagement, the arrangement of the intermediate friction wheels and their functioning in said assembly being such as to produce a self compensating effect in the drive transmitted from the driving to the driven wheels.

Although, as above noted, the mechanism of my invention is of general application, it is of particular merit as applied to operating heavy doors such as garage doors. This applies also to industrial and commercial doors. Doors of this type include what is commonly known as overhead sectional one-piece track type, one-piece pivotal or trackless, one or two-piece swinging, one-piece sliding, two-piece sliding or bi-parting, and others. The mechanism of my invention is mechanical and serves to convert the rotary motion of a driving motor to lineal movement of the door at a velocity contingent upon door mass, and doing this in a manner to avoid or overcome the effects of impact or shock loading which are common to many prior door operating mechanisms.

The primary object of my invention is to provide an improved friction drive mechanism which has general application but is particularly adapted for the conditions found in operating garage doors.

Another object is to provide a friction drive mechanism of such novel construction and function as to overcome objections to prior door operators.

Another object is to provide a friction drive mechanism of the character described embodying comparatively few parts so constructed as to permit manufacturing at a low cost.

Other objects and attendant advantages will be appreciated by those skilled in this art by reference to the following description when considered in connection with the accompanying drawings, in which:

FIGURE 3 is a vertical section taken on the section line 3—3 of FIGURE 2;

FIGURE 4 is a section taken on the section line 4—4 of FIGURE 3;

FIGURE 5 is a detail illustrating the friction contact between one of the intermediate wheels and the driven wheel;

FIGURE 6 is diagrammatic, illustrating direction of drive and forces in normal and some increased load operation;

FIGURE 7, also diagrammatical, illustrates forces at overload operation;

FIGURE 8 is a modification of the syring application in another embodiment of the mechanism;

FIGURE 9 is a section taken on the section line 9—9 of FIGURE 8;

FIGURE 10 is a further embodiment of the mechanism; and

FIGURE 11 is diagrammatic, illustrating a full stall condition.

Figure 1:
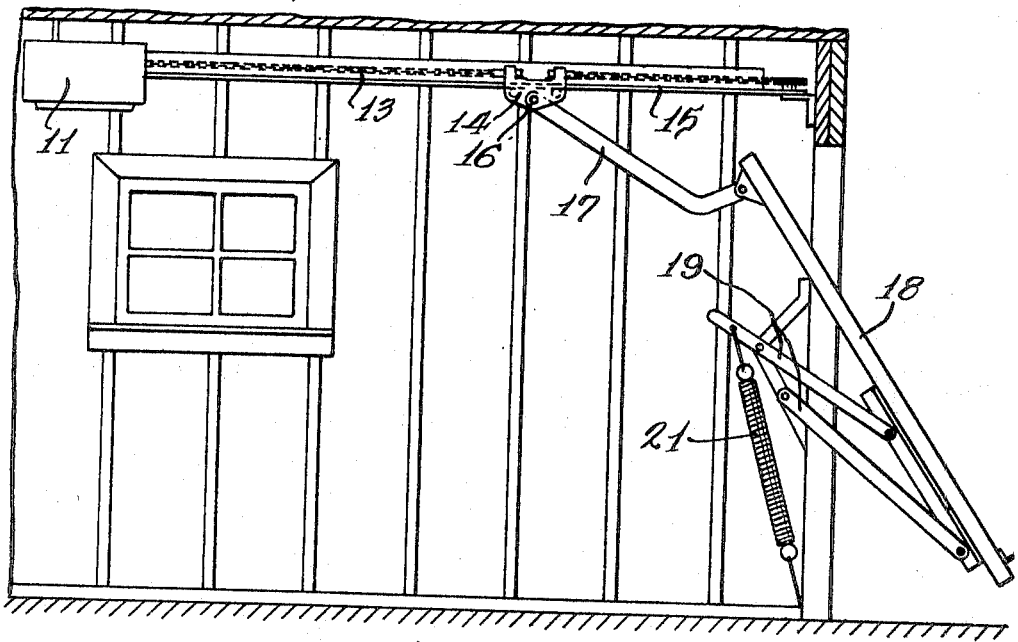
FIGURE 1 is a side elevation of a typical installation of a door operator to open and close a one-piece trackless (pivotal type) garage door, the friction drive mechanism of my invention being enclosed within the casing at the upper left corner.

As applied to a door operator, the mechanism of my invention is contained within a casing 11 suitably supported in an overhead location. This mechanism includes an electric motor 12 (FIGURE 2) which drives the friction drive mechanism. The motor drives a chain 13 which in this instance is part of a door operator. This chain is connected to a trolley 14 which is mounted to travel along a horizontal track 15 and is connected at 16 to a link 17 which in turn is connected to a one-piece door 18. The door is supported usually at each side by a linkage 19 mounted on the door jamb. The door swings on this linkage back and forth between a vertical closed position and a horizontal open position. A contractile spring 21 counteracts the weight of the door, tending to urge the door toward the open position. This showing of a garage door operation is for purpose of illustrating an example of work to be performed by the friction drive mechanism of my invention. As will be presently apparent, the electric motor when operated in one direction drives the chain 13 and the trolley 14 to the left (viewing FIGURE 1), thereby pulling the door to the open position. Reversal of the motor returns the door to the closed position.

Figure 2:
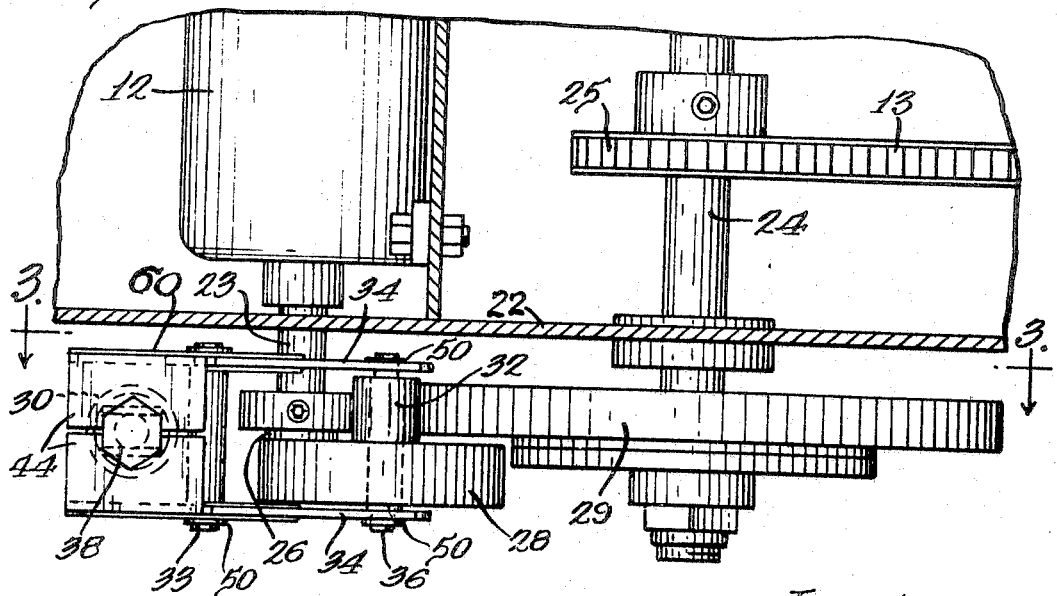
FIGURE 2 is a view looking from the bottom up of one embodiment of the friction drive mechanism.

Referring now more particularly to FIGURES 2, 3 and 4, this shows the friction drive mechanism within the casing 11. This mechanism is mounted on a suitable frame structure 22. The motor-driven shaft 23 may be considered the driving member and the shaft 24 the driven member. The shaft 24 carries a sprocket wheel 25 which drives the chain 13. A friction wheel 26 (the driving wheel) fixed on the shaft 23 has frictional driving engagement on its periphery with two intermediate friction wheels 27 and 28. Each latter wheel has fixed thereto coaxially and at one side thereof, a smaller diameter friction wheel which has frictional engagement with the periphery of a large diameter friction wheel 29 (the driven wheel) fixed to the driven shaft 24. One small diameter wheel 31 is fixed to the wheel 27 and the other small diameter wheel 32 is fixed to the wheel 28. In this specification I have throughout designated and referred to the wheels 27 and 31 as a wheel set "27–31" and also the wheels 28 and 32 as a wheel set "28–32." The intermediate wheel sets 27–31 and 28–32 are part of an assemblage which includes brackets generally designated as 60, 61, respectively, and a compression spring 30. The brackets 60–61 are in effect levers of the first kind pivotally connected together to turn about a fulcrum pin 33. In this application each bracket has laterally spaced side walls 34 upon and between which are mounted shafts 35 and 36. Intermediate wheel set 27–31 is mounted for rotation on the shaft 35 and intermediate wheel set 28–31 on the shaft 36. The compression spring 30 acts between the ends of the lever brackets remote from the intermediate friction wheels to constantly and yieldingly urge these wheels toward a center line 37 which intersects the axes of the driving shaft 23 and the driven shaft 24. In this compression spring action the intermediate wheel set 37–31 is moved clockwise about the fulcrum 33 and the wheel set 28–32 is moved counter-clockwise about said fulcrum. In this action both the large diameter intermediate wheels 37 and 38 are urged into contact with the driving wheel 26 and both the small diameter wheels 31 and 32 are urged into contact with the driven wheel 29. I prefer to provide the wheels 26, 27, 31 and 32 with a peripheral rim of polyurethane or the like, because of its advantageous properties. Wheels 27–28 have frictional drive engagement with the coarse knurled periphery of the metal driven wheel 29. Note FIGURE 5.

The degree of pressure exerted by the spring 30 in the action described may be varied by adjustment of a bolt 38 which is threaded in an abutment plate 39 and has thrust engagement at 41 in an end thrust block 52 which is fitted to the inturned cross parts 43 of the bracket 61. See FIGURE 4. The spring 30 is compressed between the abutment plate 39 and the interned cross parts 44 of the bracket 60, thus exerting the described compression force to the intermediate friction wheel sets. It will now be observed that the described assemblage is a free floating unit without attachment to the frame structure 22, with the result that it centers itself relatively as to location because of the arrangement of the intermediate wheel sets and the application of spring pressure to such units on opposite sides of the center line 37. Each of the shafts 33, 35 and 36 is retained against endwise displacement by a snap-on retainer 50 which fits into a groove in each end of the respective shaft just outside of the side wall of the adjacent brackets 60 and 61. These retainers for the shaft 33 also hold the brackets in assembled relation. Quick removability of these retainers permits removal and interchange of the intermediate wheels for change in drive reduction ratios.

In FIGURE 8 I have shown a modified form, using a compression spring 40 without adjustment, acting between the lever brackets.

In FIGURE 10 is shown a further modification in which the assemblage unit embodies brackets 45 and 56 fulcrumed at 47 so as to provide levers of the third kind. The compression spring 48 acts between an adjustable bolt 49 and the brackets to constantly and yieldingly urge the intermediate friction wheels into their respective drive engagements similar to the first described embodiment.

THE OPERATION

As mentioned in the preface, my invention is of general application, but as will be apparent from the description it is particularly adapted to converting rotary movement from a driving means such as an electric motor to lineal movement of a driven means such as a garage door operator. Here there is considerable and sometimes sudden variation in the load mass and it is desired to transmit the drive without shock and detriment to the operating parts. It is also desired to have positive drive as distinguished from some prior mechanisms which embody belt drives and clutches subject to objectionable slippage and irregular operation. With my invention a positive drive is accomplished by the unique arrangement of two sets of intermediate friction wheels 27–31 and 28–32 in an assemblage which permits these sets of friction wheels to float around a normal driving position and produce a self-compensation effect against objectionable slippage in transmitting the ultimate drive to the driven friction wheel 29.

It will be observed that since the driving wheel 26 and the driven wheel 29 are in fixed relative relation and the intermediate sets of friction wheels 27–31 and 28–32 are responsive to pressure of the spring 30 tending to move each set toward the center line 37, the pressure forces in normal load will be substantially in the direction of the arrow A as applied through wheel set 27–31 and the arrow B as applied through the wheel set 28–32, as shown in FIGURE 6. Under this condition the spring 30 is attempting to bring the intermediate wheel sets closer together, decreasing the angle between them but this is resisted by the presence and fixed positions of the driving and driven wheels 26 and 29, respectively. If the load is such that greater force is required it is transmitted by means of the assemblage intermediate wheels in the direction of the dotted line arrow C in FIGURE 6. If the force requirements are greater than normal, slippage may occur but not of a nature such as undesirable slippage in prior structures. In my mechanism slippage is inhibited by reason of the unique construction and functioning of the intermediate assemblage of friction wheel sets. The greater the spring pressure on the intermediate wheels the greater the transmitted force. When overload or sufficient increase in load occurs beyond the particular spring setting the effect is to average out the drive capacity of each intermediate wheel set, one wheel set 27–31 being forced away from the center line as indicated by the arrow D in FIGURE 7 and the other set 28–32 forced toward it as indicated by the arrow E. Under this condition there is slippage between the wheel set 27–31 and the driven wheel 29 and the other wheel set 28–32 is forced with greater pressure against the driven wheel 29 as noted by the arrow E in FIGURE 7. The effect of wheel set 28–32 being forced with greater pressure against driven wheel 29 is to increase the period of time that the driving force is transmitted to the load. This slippage of 27–31 is offset or compensated by the fact that 28–32 is being pulled into a condition of greater contact pressure between wheels 32–29 and also 28–26. This effect prevails during periods when the overload condition is temporary or short termed. Since an overload condition may be transitory in nature and may occur sporadically, rotation of the driven wheel 29 is maintained due to intermittent nature of the load and is assisted by the inertia of the load. During conditions of extreme overload or full stall the driven wheel 29 stops rotating since the load is no longer in motion. Under this condition slippage may seem to be continuous although a driving force in the original direction of lineal movement is maintained due to the self-compensating nature of the drive mechanism. Slippage and drive occur alternately due to the slight change in the angular relation about the pivot pin 33 of the intermediate drive wheel sets 27–31 and 28–32. During the interval when the mechanism is attempting to drive, the load forces on wheels 27–31 are indicated by arrows A and C (FIGURE 6), while those of wheels 28–32 are indicated by arrow B. As the requirements for greater driving power occur, arrow C illustrates the increase in pressure of wheels 27–31 against drive wheel 26 and driven wheel 29. This is due to the climbing effect of wheel 31 against wheel 29 (assuming wheel 29 is stationary) and is contingent upon pressure produced by spring 30 and the nature or characteristics of the surfaces in contact with one another of wheels 29 and 31. As approach to the conditions where slippage should occur, the forces acting on wheels 27–31 (indicated by arrow D FIGURE 7) tend to retard slippage by pulling wheel 28–32 (indicated by arrow E FIGURE 7) toward center line 37, thus increasing the wheel pressure of wheel set 28–32 against drive wheel 26 and driven wheel 29. When the power requirements have finally reached a point where slippage does occur the forces acting on wheels 27–32 are indicated by arrow D and those acting on wheels 28–32 are indicated by arrow F (FIGURE 11). At this point, with full stall, arrow E is disregarded because these forces E and F do not exist together. The instant that slippage of both wheel sets 27-31 and 28-32 occurs (see arrows D and F) the power transmitted by this mechanism from the motor to the load, drops sharply to a level where the spring 30 again forces the two intermediate friction drive wheel sets 27-31 and 28-32 toward the center line 37 causing re-engagement with driven wheel 29. The forces indicated by arrows A and B are re-established and the entire process is repeated again and again until the equipment is either turned off or the condition causing the full stall is removed.

I claim:

1. Friction drive mechanism between a driving wheel and a driven wheel which are respectively rotatable about fixed parallel axes laterally spaced apart, comprising an assemblage of intermediate friction wheels, said assemblage having two sets of such wheels, each set having a relatively large diameter wheel in frictional drive contact with the driving wheel and a relatively small diameter wheel concentric with the large diameter wheel, each small diameter wheel having a peripheral surface of polyurethane in frictional drive contact with the driven wheel, the driven wheel having a serrated peripheral surface with which said peripheral polyurethane surface of each said small diameter wheel contacts, and means yieldingly forcing the intermediate wheels into said contacts, the assemblage having floating relation to the driving and driven wheels and each set of intermediate wheels being independently responsive to said yielding force in a manner to effect self-compensating driving contact with the driven wheel.

2. Friction drive mechanism comprising a driving wheel and a driven wheel on fixed parallel axes laterally spaced apart, and an assemblage intermediate said wheels characterized by two sets of intermediate friction wheels, each set having a pair of concentric wheels one in frictional drive contact with the driving wheel and the other in frictional drive contact with the driven wheel, a pair of lever brackets pivotally connected together to turn about a fulcrum, each lever having mounted for rotation thereon one set of intermediate wheels, and a compression spring acting against the lever brackets to transmit to the respective intermediate wheel sets force yieldingly urging the intermediate wheels into the driving contacts.

3. Friction drive mechanism as set forth in claim 2, in which the assemblage is free floating with respect to the fixed axis of the driving and driven wheels.

4. Friction drive mechanism as set forth in claim 2, in which the peripheral surface of the driven wheel is serrated and the peripheral surface of each intermediate friction wheel in contact with the said serrated peripheral surface of the driven wheel is of polyurethane.

5. A garage door operator comprising an electric motor, a driving wheel of relatively small diameter driven by said motor, a door operator, a driven wheel of relatively large diameter on an axis parallel with and laterally spaced from the axis of the driving wheel, a driving connection between the driven wheel and the door operator, two intermediate wheel sets each having a relatively large diameter wheel in peripheral drive engagement with the driving wheel and a relatively small diameter wheel in peripheral drive engagement with the driven wheel, a lever bracket for each wheel set, each wheel set mounted for rotation on its lever bracket, said brackets pivotally connected together to move about a fulcrum located intermediate the axes of the wheel sets, a compression spring acting between said lever brackets constantly urging the intermediate wheels into the described drive engagements, the wheel sets being on opposite sides of a plane intersecting the axes of the driving and driven wheels, and the wheel sets, lever brackets and compression spring being in an assembly in floating relation to the driving and driven wheels with the intermediate wheels yieldingly urged by the spring pressure into said drive engagements, whereby to produce a self-compensating effect in the drive transmitted from the driving wheel and through the intermediate wheel sets to the driven wheel and the door operator.

6. Friction drive mechanism comprising a relatively small diameter driving wheel, a relatively large diameter driven wheel, each wheel rotatable about a fixed axis, the axes of said wheels being in parallel laterally spaced relation, and speed reduction means operating between the driving and driven wheels comprising a first pair of intermediate wheels each of a diameter larger than the driving wheel, a second pair of intermediate wheels each of a diameter smaller than the first intermediate wheels and fixed to rotate concentric with one such first intermediate wheel, the first intermediate wheels being in frictional contact at their peripheries with the periphery of the driving wheel at opposite sides of a plane intersecting said axes of the driving and driven wheels, the second intermediate wheels being in frictional contact at their peripheries with the periphery of the driven wheel, and means yieldingly forcing the intermediate wheels of each set into said frictional contacts, in which the yieldingly forcing means comprises a floating assemblage for holding the intermediate wheels in the described relationship and with the intermediate wheels of each concentric set free to yieldingly respond to said force, and in which said means comprises two levers pivotally connected to move about a fulcrum, each lever having mounted thereon for rotation one set of intermediate wheels, and a compression spring action between the levers for applying the yielding force.

References Cited

UNITED STATES PATENTS

| | | | |
|---|---|---|---|
| 1,289,818 | 12/1918 | Kurkjian | 74—209 |
| 2,568,869 | 9/1951 | Rieber | 74—206 |
| 2,578,082 | 12/1951 | Moomaw | 74—206 |
| 2,748,615 | 6/1956 | Nistri | 74—209 |

MILTON KAUFMAN, Primary Examiner

J. A. WONG, Assistant Examiner